UNITED STATES PATENT OFFICE.

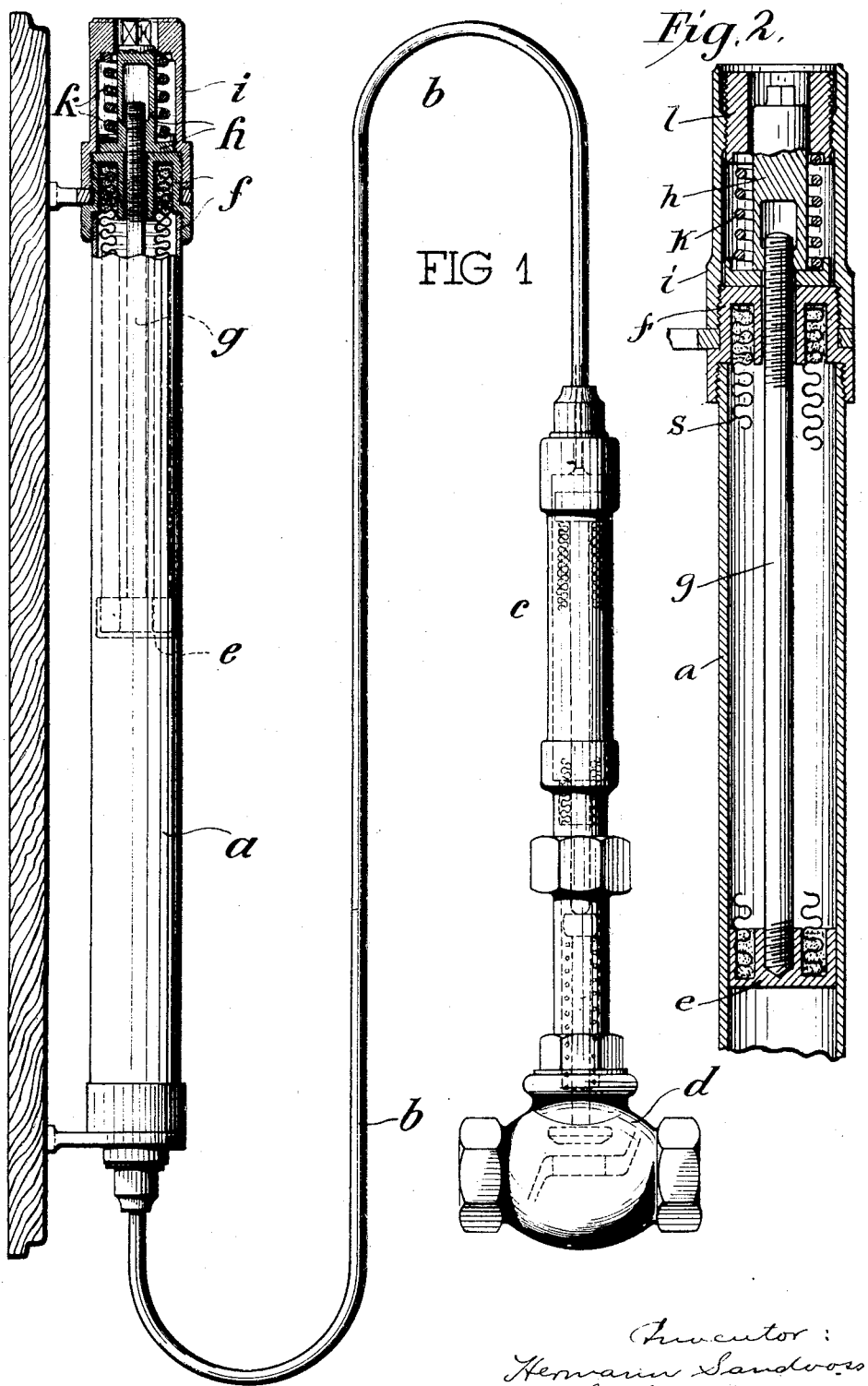

HERMANN SANDVOSS, OF HEIDELBERG, GERMANY.

THERMOSTATIC REGULATOR.

1,243,112.     Specification of Letters Patent.     Patented Oct. 16, 1917.

Application filed August 26, 1915. Serial No. 47,553.

*To all whom it may concern:*

Be it known that I, HERMANN SANDVOSS, a subject of the German Emperor, and residing at 62 Leopoldstrasse, Heidelberg, Germany, engineer, have invented certain new and useful Improvements in Thermostatic Regulators, of which the following is a statement.

The present invention relates to a safety and regulating device for temperature regulators operated by an expansive fluid or the like, thermostatically controlled steam traps and the like, by means of which device a damage to the apparatus shall be avoided, which might be feared in consequence of the expansive medium expanding still further after the valve body has already been moved on to its seat, or of the valve body being jammed by larger foreign bodies which have got into the valve.

Such devices have already been disclosed with which a piston is fitted in the vessel containing the expansive fluid and packed against the latter by an elastic corrugated hose, the packing hose, which has a sufficient resistance against compression, being displaceable by the expansive fluid only after the valve has been closed or the valve body arrested, so that said piston together with its packing hose will then act as a buffer. This known arrangement, however, has the disadvantage that the buffer hose piston will, at a highly excessive heating of the expansive medium be so strongly compressed in itself, and even possibly bent out sidewise, that when the overheating ceases, it can no more return into its original position. The apparatus fitted with this device will then no more operate accurately, because the space for the expansive liquid has become too large and the valve will therefore close at a later moment, so that a higher temperature will be reached in the space or water controlled by the apparatus. It is the object of the present invention to avoid this difficulty.

The feature of the present invention consists in that the buffer hose piston bears against a spring of a suitable strength which is supported in the casing of the apparatus and is so arranged that when the expansive fluid expands abnormally, either both will yield simultaneously or first the spring and then the buffer hose, and are compressed or extended respectively, whereupon after the return of the piston packing hose the spring power of the latter is supported by the power of the auxiliary spring and will compensate a noxious shortening or elongation of the buffer hose which might have occurred.

Preferably the supporting bearing of the auxiliary spring is adjustably fitted to the casing of the apparatus, so that besides the automatic regulation of the buffer hose also a regulation by hand is possible.

In the accompanying drawing a constructional form of the invention is shown in Figure 1 partly in elevation, partly in section. Fig. 2 is a longitudinal section of a modification.

The temperature regulator according to Fig. 1 comprises a temperature receiving vessel $a$ and a vessel $c$ communicating therewith by means of a thin tube $b$, into which the valve body of the stop valve $d$ enters with a tight joint with a rod having within the shape of a piston. The two vessels $a$, $c$ and the communicating tube $b$ are filled with the expansive fluid.

Into the vessel $a$ dips the piston $e$ which is packed against the expansive fluid by means of a peculiarly corrugated elastic buffer hose $s$ of a given resistance against the expansive fluid, and closely soldered to the bottom end of the piston and, at the top to a cap $f$ screwed to the vessel $a$. This piston is slidably guided with its rod $g$ in a bore of the cap $f$. The piston rod $g$ projects with its free end out of the vessel $a$, being threaded at this end and carrying on said thread a nut $h$ with the corresponding female thread; the extreme end of the piston rod is filed into a square. By suitably tightening the nut $h$ the piston can be raised or lowered, whereby its packing hose is simultaneously compressed, and the space available for the expansive fluid is thereby regulated. In order to prevent such adjustment being performed by unauthorized persons, the adjusting nut is covered with a second cap $i$. This cap is bored at the top, and into this bore the square of the nut projects, so that the said nut can only be turned by means of a certain spanner.

In the space between the nut $h$ and the cap $i$ is fitted the auxiliary spring $k$, which is made of a smaller strength than the buffer hose $s$ and which bears at the top against the cap $i$ and below against a shoulder of the nut $h$.

When, now, the expansive fluid is heated beyond the normal limit, the piston $e$ will, if the valve $d$ is closed beforehand, or the valve body is arrested, yield and be moved upward, whereby simultaneously the packing hose $s$ and the spring $k$ are compressed. When the temperature sinks again to its normal degree the piston will under action of the hose $s$ and the spring $k$ return again into its initial position. Even if the compression of the hose should have been so great that it has lost some of its spring, and can no more return by its own force into its initial position, it will nevertheless be returned thereto by the auxiliary spring $k$.

The constructional form according to Fig. 2 differs from the foregoing one in that the cap $l$ of the nut $h$ is arranged to screw in the same. It is therefore possible to vary the force of spring $k$ by correspondingly turning the cap $l$ by hand, so that the force acting on the piston $e$ may be regulated.

I claim:

A thermostatic regulator comprising a vessel containing an expansive fluid, an inclosed piston having a threaded rod, an elastic buffer hose engaging the piston, a nut engaging the threaded rod, an auxiliary spring engaging the nut, and a cap inclosing the auxiliary spring.

In testimony whereof I have hereunder signed my name in the presence of two subscribing witnesses.

HERMANN SANDVOSS.

Witnesses:
 GEORG HOFFENSTEIN,
 C. INNESS BROWN.